US012566866B2

(12) United States Patent
Bober et al.

(10) Patent No.: US 12,566,866 B2
(45) Date of Patent: Mar. 3, 2026

(54) IDENTIFICATION OF AN UNDESIRABLE SOFTWARE IMAGE

(71) Applicant: Dell Products L.P., Round Rock, TX (US)

(72) Inventors: Roman Bober, Ashdod (IL); Maxim Balin, Gan-Yavne (IL); Stav Sapir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/646,592

(22) Filed: Apr. 25, 2024

(65) Prior Publication Data

US 2025/0335596 A1      Oct. 30, 2025

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 2021/0264029 A1* | 8/2021 | Yoo | G06F 16/9024 |
| 2022/0222351 A1* | 7/2022 | Levin | G06F 8/71 |
| 2023/0195901 A1* | 6/2023 | Allen | G06F 8/71 726/25 |
| 2024/0338459 A1* | 10/2024 | Lukas | G06F 21/57 |

* cited by examiner

*Primary Examiner* — Scott B Christensen
(74) *Attorney, Agent, or Firm* — WOMBLE BOND DICKINSON (US) LLP

(57) ABSTRACT

Methods and systems for managing operation of edge devices that host software objects are disclosed. The operation of the edge devices may be managed by monitoring the software objects. The software objects may be monitored by managing vulnerabilities of an undesirable software image on which a portion of software objects is based. The vulnerabilities of the undesirable software object may be managed by generating a compliance decision based on compliance standards that are met by the undesirable software object. The compliance decision may be used to generate a prioritization for remediation of the undesirable software image.

20 Claims, 7 Drawing Sheets

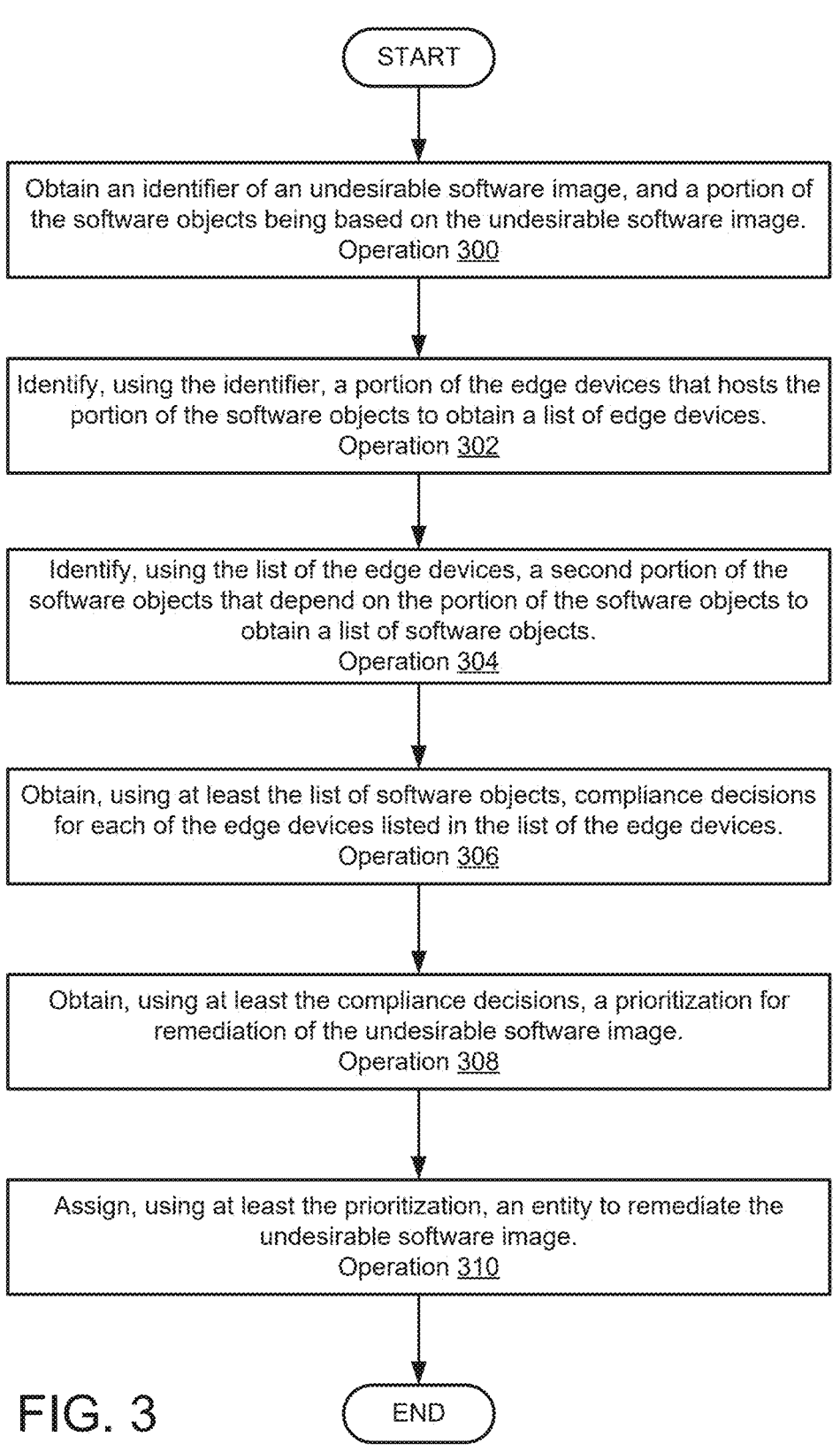

START

Obtain an identifier of an undesirable software image, and a portion of the software objects being based on the undesirable software image.
Operation 300

Identify, using the identifier, a portion of the edge devices that hosts the portion of the software objects to obtain a list of edge devices.
Operation 302

Identify, using the list of the edge devices, a second portion of the software objects that depend on the portion of the software objects to obtain a list of software objects.
Operation 304

Obtain, using at least the list of software objects, compliance decisions for each of the edge devices listed in the list of the edge devices.
Operation 306

Obtain, using at least the compliance decisions, a prioritization for remediation of the undesirable software image.
Operation 308

Assign, using at least the prioritization, an entity to remediate the undesirable software image.
Operation 310

END

FIG. 3

IDENTIFICATION OF AN UNDESIRABLE SOFTWARE IMAGE

FIELD

Embodiments disclosed herein relate generally to managing operation of edge devices that host software objects. More particularly, embodiments disclosed herein relate to managing vulnerabilities of an undesirable software image on which the software objects are based.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows flow a diagram illustrating a method in accordance with an embodiment.

DETAILED DESCRIPTION

Figure 1:
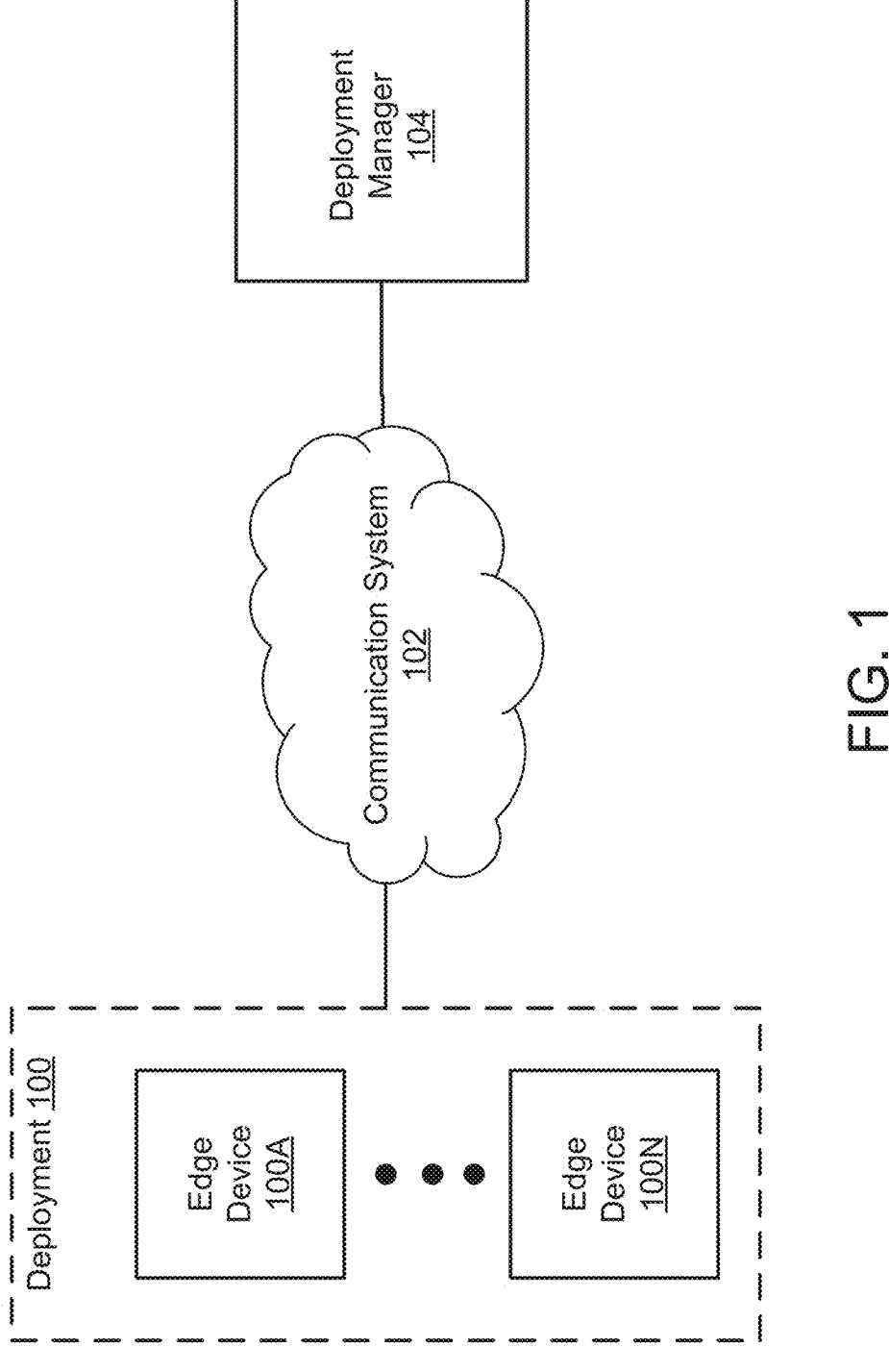
FIG. 1 show a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of edge devices that host software objects. The operation of the edge devices may be managed by monitoring the software objects. The software objects may be monitored by managing vulnerabilities of an undesirable software image on which the software objects are based.

The vulnerabilities of the undesirable software image may be managed by identifying performance of the undesirable software image in a simulation environment of the software objects. The simulation environment may replicate an environment based on the edge devices. Performance of the undesirable software image may be identified by monitoring performance of the software objects which are based on the undesirable software image.

Using the software objects, the edge devices may be identified that host a first portion of the software objects. Using the edge devices, a second portion of software objects may be identified that depend on the first portion of the software objects.

The second portion of the software objects may be used to make compliance decisions for the edge devices. The list of the second portion may be used by qualifying whether a compliance standard may be met by the undesirable software image which may be a dependency of the second portion of the software objects.

The compliance decisions may be used to make a prioritization. The prioritization may qualify a need for remediation of the undesirable software image. The prioritization may determine a placement in a workload queue system for remediation of the undesirable software object.

In an embodiment, a method for managing operation of edge devices that host software objects is disclosed. The method may include (i) obtaining an identifier of an undesirable software image, wherein a portion of the software objects hosted by the edge devices is based on the undesirable software image; (ii) identifying, using the identifier, a portion of the edge devices that host the portion of the software objects to obtain a list of edge devices; (iii) identifying, using the list of the edge devices, a second portion of the software objects that depend on the portion of the software objects to obtain a list of software objects; (iv) obtaining, using at least the list of the software objects, compliance decisions for each of the edge devices listed in the list of the edge devices; (v) obtaining, using at least the compliance decisions, a prioritization for remediation of the undesirable software image; and (vi) assigning, using at least the prioritization, an entity to remediate the undesirable software image.

The method may further include, prior to obtaining the identifier: (i) obtaining a software image usable to instantiate at least one of the software objects; (ii) obtaining, using the software image, a digitally signed software image; (iii) obtaining, for the digitally signed software image, dependencies on other software images; (iv) obtaining, for the digitally signed software image, compliance checks that indicate whether the digitally signed software image meets compliance standards; and (v) storing the digitally signed software image, the dependencies, and the compliance checks in a software image repository.

Obtaining the identifier of the undesirable software image may include (i) identifying the undesirable software image using a simulation environment that is hosted by a data center and separate from the deployment of the edge devices; and (ii) obtaining a globally unique identifier for the undesirable software image.

The undesirable software image may fail to meet compliance standards that discriminate acceptable from unacceptable behavior of operation of software objects based on the undesirable software image.

Each of the edge device may be configured to only allow software objects to be instantiated using digitally signed software images.

Identifying the second portion of the software objects may include (i) identifying other software objects that depend on the undesirable software image; and (ii) filtering the software objects based on the other software images to obtain identifiers of the second portion of the software objects.

Obtaining the compliance decisions may include (i) obtaining compliance standards for the undesirable software image; and (ii) for a compliance standard of the compliance standards: qualifying whether the compliance standard is met by the undesirable software image.

Obtaining the prioritization for the remediation may include (i) using the compliance decisions to generate a priority for the undesirable software image; and (ii) rank ordering, by the priority for the undesirable software image and priorities of other undesirable software images, the undesirable software image and the other undesirable software images to obtain the prioritization.

The prioritization may be a measure that quantifies relative level of merit for remediating the undesirable software image relative to a portion of the other undesirable software images.

Assigning an entity to remediate the undesirable software image may include adding a new entry to a workload queue system based on the prioritization.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, edge devices may be deployed. The edge devices may be deployed to one or more remote sites far away from a data center. At the one or more remote sites, the edge devices may host software objects.

A software object of the software objects may be a compiled executable of software that runs on an edge device of the edge devices and provides computer implemented services at the one or more remote sites. A software image of the software object may be verified and validated at the data center. The software image may be a compiled executable, like the software object, but does not run on the edge device of the edge devices.

The edge devices may execute the software object. Execution of the software object may subject the edge devices to security and/or operational weaknesses. The source of the security and/or operational weaknesses may be the software object. The software object may include vulnerabilities which compromise the edge devices.

However, because the edge devices are deployed to one or more remote sites, a direct assessment of the software object implemented by the edge devices may not be possible. Because the direct assessment of the software object may not be possible, identification of the vulnerabilities and management of the software object may not be possible. Without the identification of the vulnerabilities and the management of the software object, computer implemented services by the software object may be hindered or negated.

In general, embodiments disclosed here relate to systems and methods for managing operation of edge devices that host software objects. The operation of the edge devices may be managed by monitoring the software objects. The software objects may be monitored by managing vulnerabilities of an undesirable software image on which a portion of software objects is based.

One or more vulnerabilities may be detected for the undesirable software image. The vulnerabilities may be detected through vulnerability testing of the undesirable software image. The vulnerability testing may be performed in a simulation environment. By performing vulnerability testing in the simulation environment, a need to remediate the undesirable software image after deployment to a remote site may be avoided. A software object of the undesirable software image may then be executed by the edge devices.

To remediate the software object of the undesirable software image in the simulation environment, an identifier of the undesirable software image may need to be obtained. The identifier may be obtained by obtaining the undesirable software image from a software image repository in the data center. The data center may be where the software images are developed, verified, and/or validated. From the undesirable software image in the software image repository, the identifier may be obtained.

Using the identifier, the edge devices may be identified that host a portion of the software objects which are based on the undesirable software image. The edge devices may be identified by searching through a lookup data structure to find the edge devices and their software objects. The edge devices that use a software object which are based on the undesirable software image may be added to a first list of the edge devices.

Using the first list of the edge devices, a second list of software objects may be identified that depend on the portion of the software objects which are based on the undesirable software image. The second list may be obtained by identifying other software images that depend on the undesirable software image and obtaining other software objects which are based on the other software images. The other software objects may be added to the second list of software objects.

Using the second list of the software objects, compliance decisions may be reached for the edge devices. The compliance decisions may determine if the edge devices, with their dependence on the undesirable software image, are not in line with compliance standards.

Based on the compliance decisions, a prioritization for remediation of the undesirable software image may be established. The prioritization may be established by qualifying a level of merit for remediating the undesirable software object. Depending on the level of the merit, a placement in a workload queue system may be made. The placement in the workload queue system may determine how quickly the undesirable software image may be remediated.

To provide the above noted functionality, the system may include deployment 100 and deployment manager 104. Each of these components is discussed below.

Deployment 100 may include edge device 100A-100N. Edge device 100A-100N may be deployed to one or more remote locations apart from deployment manager 104. Edge device 100A-100N may host software objects to enable the edge devices to provide computer implemented services. The software object on edge device 100A-100N may include vulnerabilities. The vulnerabilities from the software object may hinder or negate the computer implemented services. The vulnerabilities may be discovered by the deployment manager using a software image on which the software object is based.

Deployment manager 104 may prevent undesired software images occurring in edge device 100A-100N. To prevent the undesired software images occurring in edge device 100A-100N, deployment manager 104 may host software images on which the software objects are based. The software images may be introduced to a simulation environment hosted by deployment manager 104. The simulation environment may permit vulnerabilities testing on the software images. Th vulnerabilities testing may be used to find vulnerabilities on an undesirable software image of the software images. The undesirable software image may be remediated based on an impact against compliance standards necessary to be met by the edge devices.

Figure 2A:
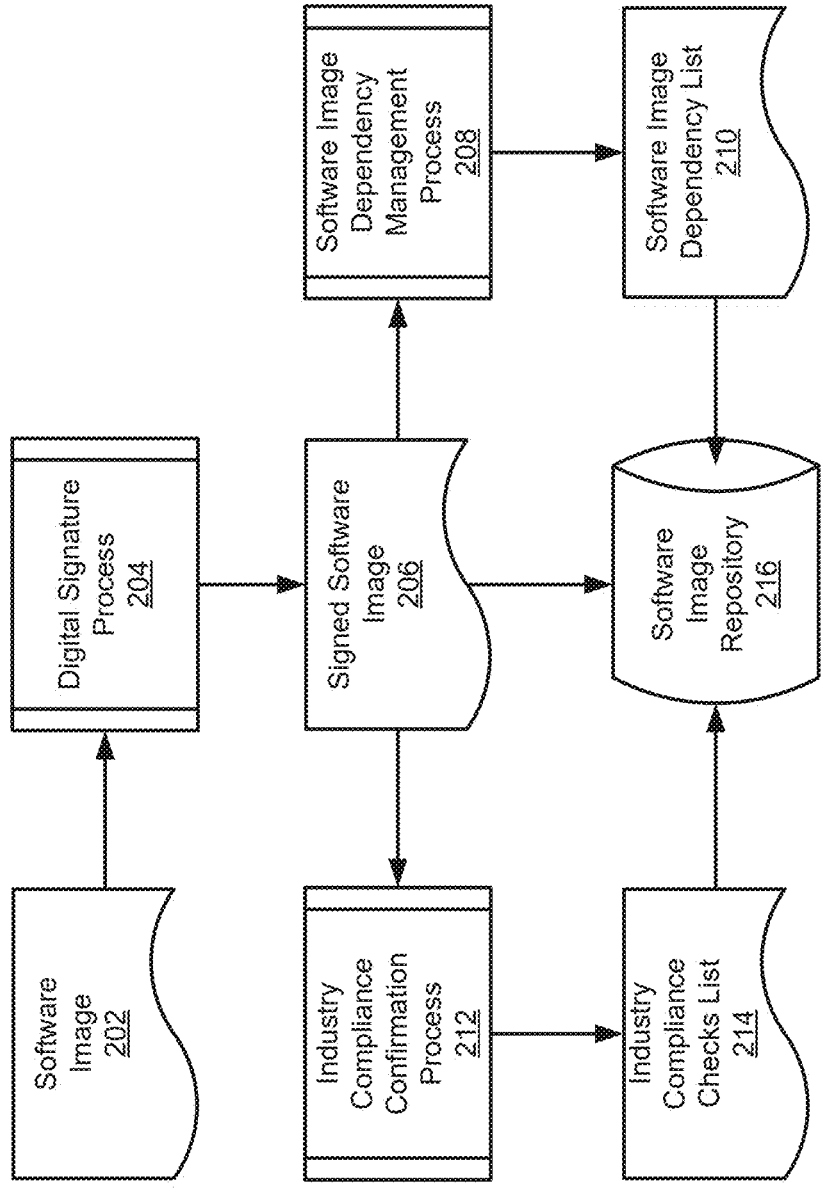
FIGS. 2A-2D show data flow diagrams illustrating operation of a system in accordance with an embodiment.

While providing their functionality, any of deployment 100 and deployment manager 104 may perform all, or a portion, of the flows and methods shown in FIGS. 2A-3.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 202, 206, etc.) is used to represent data structures, a second set of shapes (e.g., 204, 208, etc.) is used to represent processes performed using and/or that generate data, and a third set of shapes (e.g., 216, 224, etc.) is used to represent large scale data structures such as databases.

Turning to FIG. 2A, a first data flow diagram in accordance with an embodiment is shown. The first data flow diagram may illustrate data used in and data processing performed in storing software images in a software image repository.

To perform implementation of the software image repository, digital signature process 204 may be performed. During digital signature process 204, software image 202 may be digitally signed. Software image 202 may be an executable binary of software. Software image 202 may include source code, libraries, configuration files, and/or other assets. Once software image 202 has been verified and/or validated, a digital signature may be applied to software image 202 to ensure integrity and authenticity to generate signed software image 206.

In addition to generating signed software image 206, software image dependency management process 208 may be performed. During software image dependency management process 208, the dependencies of signed software image 206 may be mapped. The dependencies may be mapped by generating a dependency tree for signed software image 206. The dependency tree may be stored as software image dependency list 210.

Following software image dependency management process 208, industry compliance confirmation process 212 may be performed. During industry compliance confirmation process 212, signed software image 206 may be checked for adherence to compliance standards. The adherence to compliance standards may be checked by performing tests including unit testing, functional testing, functional testing, end-to-end testing, acceptance testing and/or performance testing. The results of the tests may be organized in industry compliance checks list.

Following industry compliance confirmation process 212, signed software image 206, industry compliance checks list 214, and software image dependency list 210 may be stored in software image repository 216. Storing these data structures in software image repository 216 may render them immutable and may prevent unauthorized access or modification.

Figure 2B:
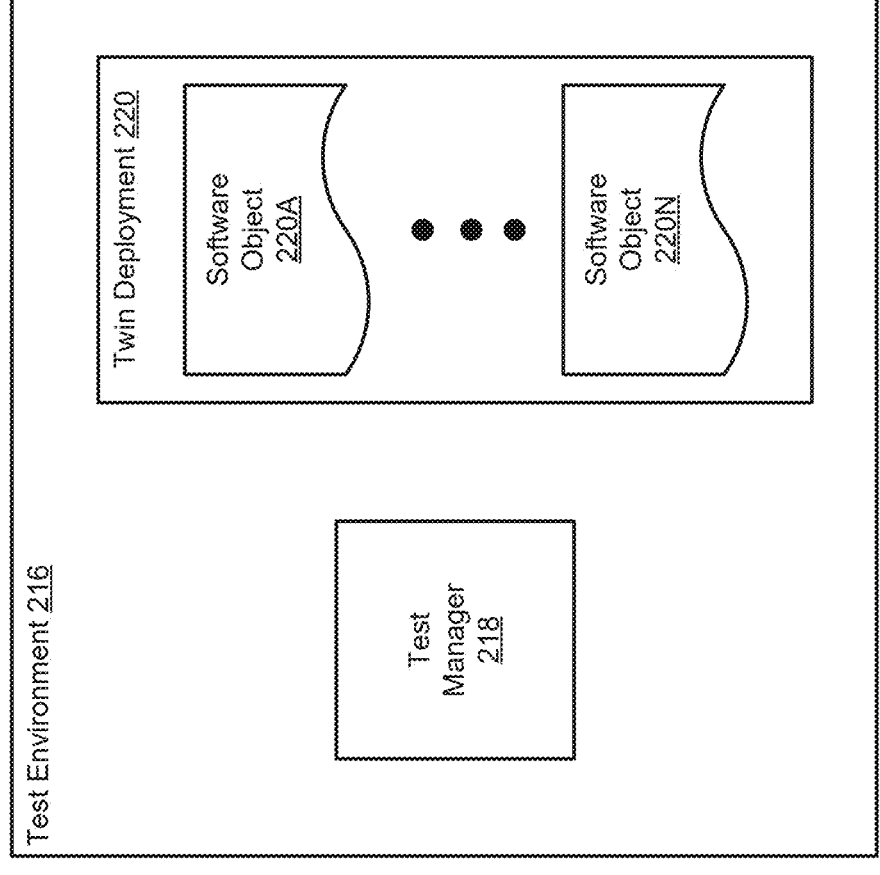

Turning to FIG. 2B, a second diagram in accordance with an embodiment is shown. The second diagram may illustrate data used in and data processing performed in implementation of a test environment.

To perform implementation of a test environment, test environment 216 may be utilized. Test environment 216 may include test manager 218 and twin deployment 220. Test environment 216 may be utilized by simulating deployment 100 and monitoring activities of deployment 100 with test manager 218.

Twin deployment 220 may include software object 220A-220N. Software object 220A-220N may be compiled executables of software images from software image repository 216. Software object 220A-220N may be run on simulated edge devices within twin deployment 220. The simulated edge devices may be function similarly to real-world edge devices. The simulated edge devices may function by running software object 220A-220N, simulating extraction of real-world data and experiencing real-world malfunctions. Real-world malfunctions may include physical degradation, penetration attempts, and/or other malfunctions by the simulated edge devices. During the running of software object 220A-220N, status updates may be monitored by test manager 218.

Test manager 218 may monitor status updates to inspect the health of software object 220A-220N. In addition to inspecting the health, test manager 218 may perform vulnerability testing on software object 220A-220N. Vulnerability testing may be similar to tests to meet compliance standards. Tests may include unit testing, functional testing, functional testing, end-to-end testing, acceptance testing and/or performance testing. The tests may be done at scheduled and/or random times to ensure proper behaviors and responses by software object 220A-220N.

If a software object of software objects 220A-220N may fail vulnerability testing and/or exhibit unhealthy behavior, then test manager 218 may label the software object as an undesirable software object. The undesirable software object may fail the vulnerability testing and/or exhibit unhealthy behavior by failing to meet criteria established in a vulnerability test and/or a compliance standard. The impact on software object 220A-220N of a vulnerability and/or unhealthy behavior by the undesirable software object may be measured by (i) obtaining a list of software objects that depend on the undesirable software object and (ii) prioritizing remediation of software image 202 on which the undesirable software object is based.

Figure 2C:
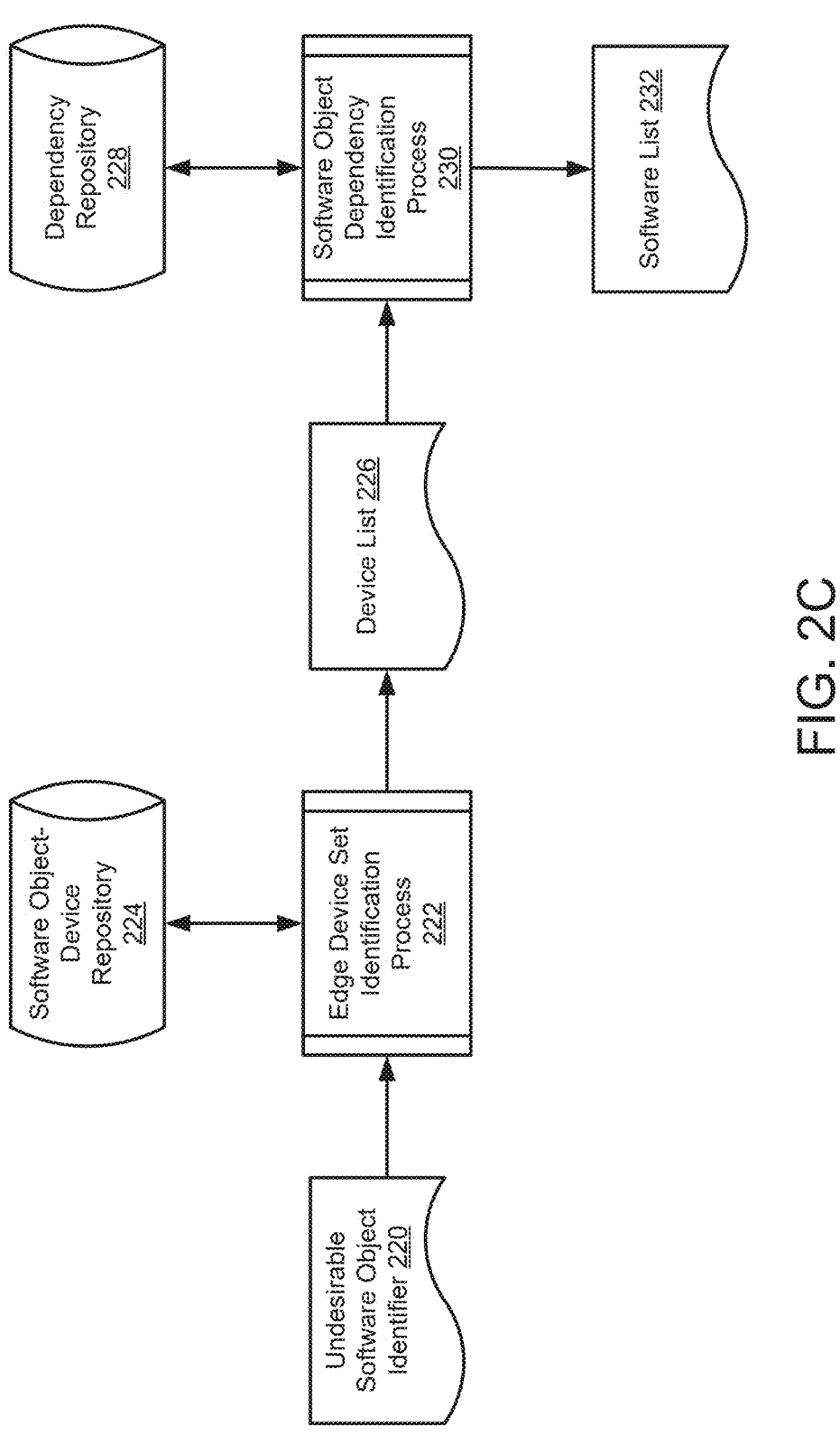

Turning to FIG. 2C, a third data flow diagram in accordance with an embodiment is shown. The third data flow diagram may illustrate data used in and data processing performed in obtaining a list of software objects that depend on an undesirable software object.

To obtain the list of the software objects, edge device set identification process 222 may be performed. During edge device set identification process 222, undesirable software object identifier 220 may be ingested. Undesirable software object identifier 220 may be a unique identifier for the undesirable software object.

Using undesirable software object identifier 220, software object-device repository 224 may be searched. Software object-device repository 224 may be searched by obtaining a list of edge devices that use the undesirable software object having undesirable software object identifier 220 as the unique identifier. The list of edge devices that use the undesirable software object may be enumerated on device list 226.

Device list 226 may be ingested by software object dependency identification process 230. During software object dependency identification process 230, device list 226 may be used to search dependency repository 228. Using device list 226, dependency repository may be search by obtaining software objects on device list 226 that use the undesirable software object as a dependency. The software objects may be enumerated on software list 232.

Figure 2D:
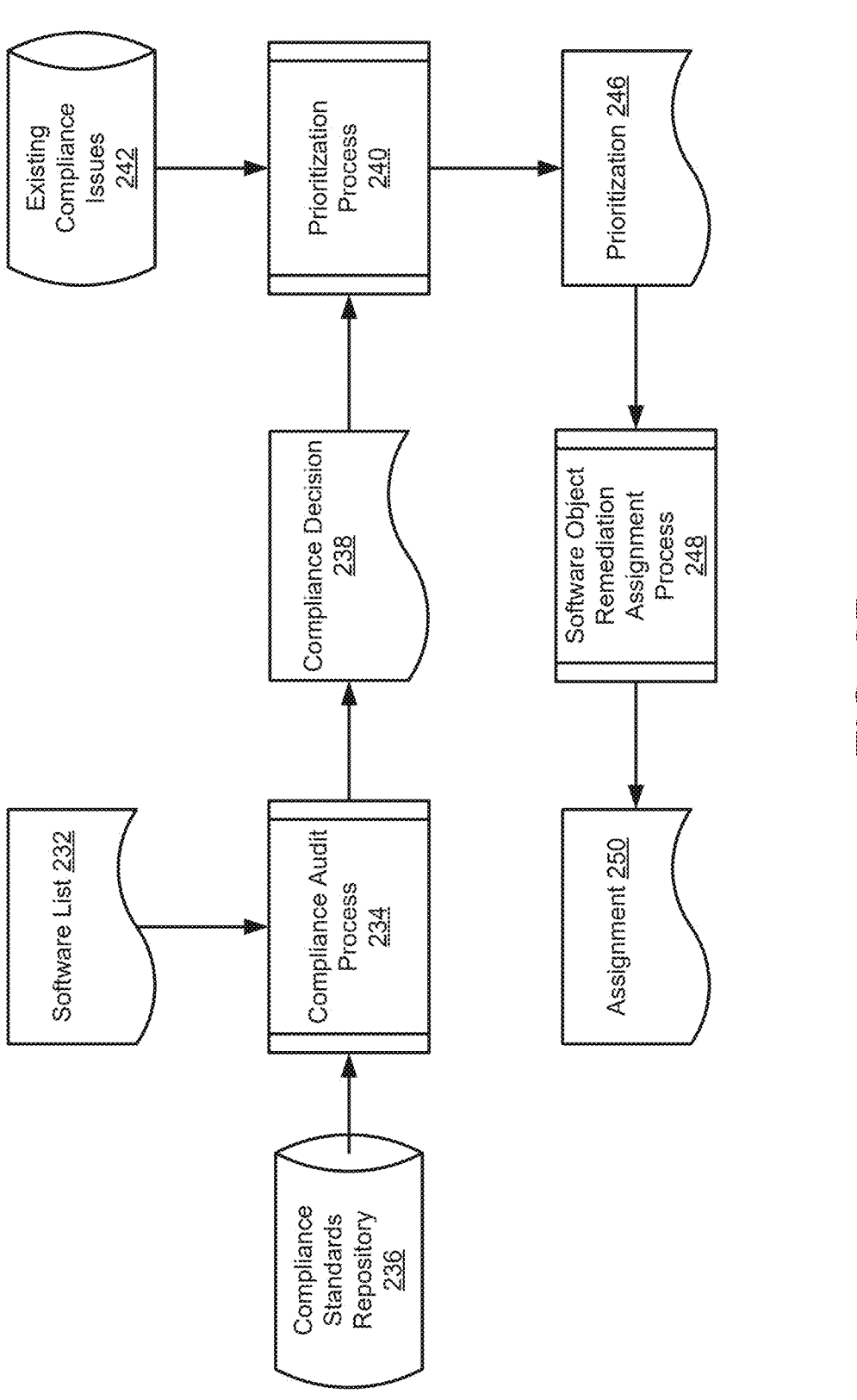

Turning to FIG. 2D, a fourth data flow diagram in accordance with an embodiment is shown. The fourth data flow diagram may illustrate data used in and data processing performed in prioritizing and assigning remediation of software image 202 on which the undesirable software object is based.

To prioritize and assign the remediation of software image 202, compliance audit process 234 may be performed. During compliance audit process 234, software list 232 from FIG. 2C may be ingested. After ingestion of software list 232, the contents of compliance standards repository 236 may be ingested. The contents of compliance standards repository 236 may include compliance standards which are expected to be met by software objects. Compliance standards may include regulations concerning policies and formatting, content, and quality of input data read by software objects, processes performed in software objects, and output data written by the software objects.

Further, during compliance audit process 234, the input data, the processes, and the output data of software objects in software list 232 may be compared to the compliance standards in compliance standards repository 236. The input data, the processes, and the output data may be compared to compliance standards by assessing whether the input data, the processes, and the output data adhere to the regulations put forth by the compliance standards.

In comparing the input data, the processes, and the output data to the compliance standards, compliance decision may be generated. Compliance decision 238 may include data regarding whether and how well compliance standards are met by software list 232. Compliance decisions 238 may include data with metrics that illustrate the magnitude of compliance by software list 232. Compliance decision 238 may be ingested to perform prioritization process 240.

During prioritization process 240, compliance decision 238 may be used to establish a priority concerning remediation of software image 202 on which the software in software list 238 depend. The priority may be based on whether and how well compliance standards are met by software list 232. The priority may be compared to priorities within existing compliance issues 242. Existing compliance issues 242 may include the priorities for other compliance decisions pertaining to other software objects that require remediation.

From prioritization process 240, prioritization 246 may be generated. Prioritization 246 may include a priority for the remediation of software image 202. Prioritization 246 may be ingested by software object remediation assignment process 248.

During software object remediation assignment process 248, an assignment of the remediation of the undesirable software object may be made. The assignment may be made by scheduling the remediation of software object 202 in workload queue system. The workload queue system may include a list of remediations to one or more software images to be completed. The list of the remediations may be ordered by prioritization.

To generate assignment 250, the remediation of software image 202 may be inserted in the list of the remediations based on prioritization 246. Assignment 250 may include details such as the identifier of software image 202 and the ranking for the remediation of the software image 202 on the list of the remediations.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage interfaces for peripheral devices. FIG. 3 illustrate a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of edge devices that host software objects in accordance with an embodiment is shown. The method may be performed, for example, by any of the components of the system of FIG. 1, and/or other components not shown therein.

At operation 300, an identifier of an undesirable software image may be obtained, and a portion of the software objects may be based on the undesirable object. The identifier may be obtained by (i) identifying the undesirable software image using a simulation environment that is hosted by a data center and separate from the deployment of the edge devices; and (ii) obtaining a globally unique identifier for the undesirable software image.

The undesirable software image may be identified by identifying a software object with vulnerabilities in the simulation environment. The globally unique identifier may be obtained by performing a search in a registry of the simulation environment for the undesirable software image.

At operation 302, a portion of the edge devices may be identified, using the identifier, that hosts the portion of the software objects to obtain a list of edge devices. The portion of the edge devices may be identified by performing, using the identifier, a search on a lookup data structure which lists the edge devices and portions of the software objects that each of the edge devices hosts to obtain identifiers of the portion of the edge devices. A search on the lookup data structure may be performed by querying for the edge devices and each of the software objects that the edge devices hosts.

At operation 304, a second portion of the software objects may be identified, using the list of the edge devices, that depend on the portion of the software objects to obtain a list of software objects. The second portion of the software objects may be identified by (i) identifying other software images that depend on the undesirable software image; and (ii) filtering the software objects based on the other software images to obtain identifiers of the second portion of the software objects.

The software images that depend on the undesirable software image may be identified by performing a second search on the lookup data structure to obtain the other software images. The software objects may be filtered by removing second software objects from results of the second search that are not based on the other software images.

At operation 306, compliance decisions, using at least the list of the software objects, may be obtained using at least the list of the software objects. Compliance decisions may be obtained by (i) obtaining compliance standards for the undesirable software image; and (ii) for a compliance standard of the compliance standards: qualifying whether the compliance standard is met by the undesirable software image.

The compliance standards for the undesirable software image may be obtained by identifying industry standards by which to comply in an application of the undesirable software image. The compliance standard may be qualified as to whether the compliance standard is met measuring performance of a software object based on the undesirable software image to meet the compliance standard.

At operation 308, a prioritization for remediation of the undesirable software image, using at least the compliance decisions, may be obtained. The prioritization may be obtained by (i) using the compliance decisions to generate a priority for the undesirable software image; and (ii) rank ordering, by the priority for the undesirable software image and priorities of other undesirable software images, the undesirable software image and the other undesirable software images to obtain the prioritization.

The compliance decisions may be used to generate a priority by measuring a need to remediate the undesirable software image so that at least one compliance standard is met. The undesirable software image and the other undesirable software images may be rank ordered by comparing the priorities between the undesirable software image and the other undesirable software images and generating a list, based on the priorities, for remediation of all the undesirable software objects.

At operation 310, an entity may be assigned, using at least the prioritization, to remediate the undesirable software objects. The entity may be assigned by adding a new entry to a workload queue system based on the prioritization. The new entry may be added by inserting at least one remediation task from the list of remediation tasks for the undesirable software objects to the workload queue system.

The method may end following operation 310.

Thus, via the method shown in FIG. 3, embodiments herein may likely reduce the likelihood of undesirable software images being deployed to edge systems. By reducing the likelihood of undesirable software images being deployed, the edge systems may be more likely to provide desirable computer implemented services by, for example, exhibiting fewer errors in operation, having an improved security posture, etc.

Figure 4:
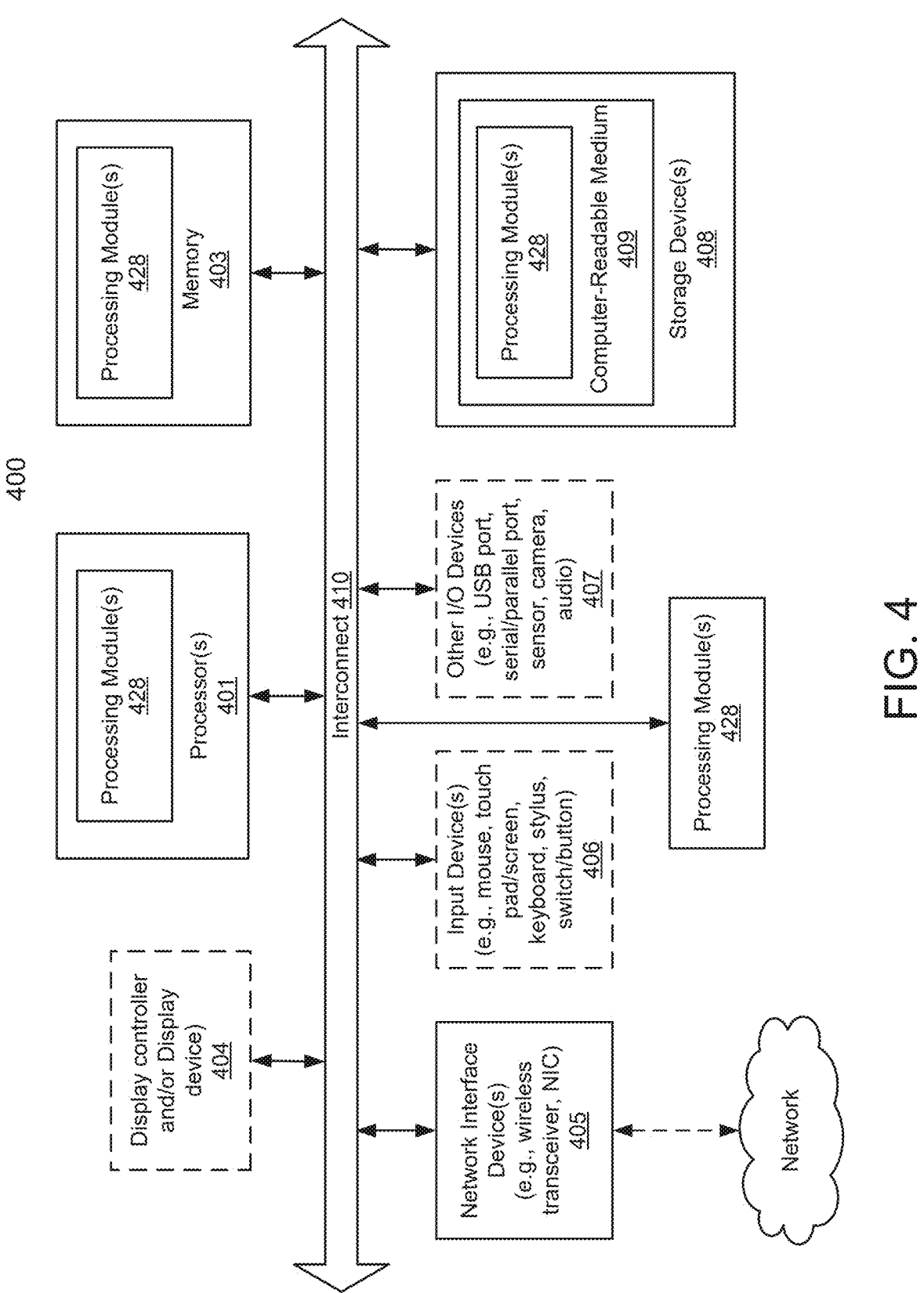
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

The invention claimed is:

1. A method for managing operation of edge devices that host software objects, the method comprising:
   obtaining an identifier of an undesirable software image, wherein a portion of the software objects hosted by the edge devices is based on the undesirable software image;
   identifying, using the identifier, a portion of the edge devices that host the portion of the software objects to obtain a list of edge devices;
   identifying, using the list of the edge devices, a second portion of the software objects that depend on the portion of the software objects to obtain a list of software objects;
   obtaining, using at least the list of the software objects, compliance decisions for each of the edge devices listed in the list of the edge devices;
   obtaining, using at least the compliance decisions, a prioritization for remediation of the undesirable software image; and
   assigning, using at least the prioritization, an entity to remediate the undesirable software image.

2. The method of claim 1, further comprising:
   prior to obtaining the identifier:
   obtaining a software image usable to instantiate at least one of the software objects;
   obtaining, using the software image, a digitally signed software image;
   obtaining, for the digitally signed software image, dependencies on other software images;
   obtaining, for the digitally signed software image, compliance checks that indicate whether the digitally signed software image meets compliance standards; and
   storing the digitally signed software image, the dependencies, and the compliance checks in a software image repository.

3. The method of claim 1, wherein obtaining the identifier of the undesirable software image comprises:
   identifying the undesirable software image using a simulation environment that is hosted by a data center and separate from deployment of the edge devices; and
   obtaining a globally unique identifier for the undesirable software image.

4. The method of claim 3, wherein the undesirable software image fails to meet compliance standards that discriminate acceptable from unacceptable behavior of operation of software objects based on the undesirable software image.

5. The method of claim 1, wherein each of the edge device is configured to only allow software objects to be instantiated using digitally signed software images.

6. The method of claim 1, wherein identifying the portion of the edge devices comprises:
  performing, using the identifier, a search on a lookup data structure which associates the edge devices and portions of the software objects that each of the edge devices hosts to obtain identifiers of the portion of the edge devices.

7. The method of claim 1, wherein identifying the second portion of the software objects comprises:
  identifying other software objects that depend on the undesirable software image; and
  filtering the software objects based on the other software images to obtain identifiers of the second portion of the software objects.

8. The method of claim 1, wherein obtaining the compliance decisions comprises:
  obtaining compliance standards for the undesirable software image; and
  for a compliance standard of the compliance standards:
    qualifying whether the compliance standard is met by the undesirable software image.

9. The method of claim 1, wherein obtaining the prioritization for the remediation comprises:
  using the compliance decisions to generate a priority for the undesirable software image; and
  rank ordering, by the priority for the undesirable software image and priorities of other undesirable software images, the undesirable software image and the other undesirable software images to obtain the prioritization.

10. The method of claim 9, wherein the prioritization is a measure that quantifies relative level of merit for remediating the undesirable software image relative to a portion of the other undesirable software images.

11. The method of claim 10, wherein assigning an entity to remediate the undesirable software image comprises:
  adding a new entry to a workload queue system based on the prioritization.

12. A non-transitory machine-readable medium having instructions stored therein, which when executed by a processor, cause the processor to perform operations for managing edge devices that host software objects, the operations comprising:
  obtaining an identifier of an undesirable software image, wherein a portion of the software objects hosted by the edge devices is based on the undesirable software image;
  identifying, using the identifier, a portion of the edge devices that host the portion of the software objects to obtain a list of edge devices;
  identifying, using the list of the edge devices, a second portion of the software objects that depend on the portion of the software objects to obtain a list of software objects;
  obtaining, using at least the list of the software objects, compliance decisions for each of the edge devices listed in the list of the edge devices;
  obtaining, using at least the compliance decisions, a prioritization for remediation of the undesirable software image; and
  assigning, using at least the prioritization, an entity to remediate the undesirable software image.

13. The non-transitory machine-readable medium of claim 12, wherein the operations further comprise:
  prior to obtaining the identifier:
    obtaining a software image usable to instantiate at least one of the software objects;
    obtaining, using the software image, a digitally signed software image;
    obtaining, for the digitally signed software image, dependencies on other software images;
    obtaining, for the digitally signed software image, compliance checks that indicate whether the digitally signed software image meets compliance standards; and
    storing the digitally signed software image, the dependencies, and the compliance checks in a software image repository.

14. The non-transitory machine-readable medium of claim 12, wherein obtaining the identifier of the undesirable software image comprises:
  identifying the undesirable software image using a simulation environment that is hosted by a data center and separate from deployment of the edge devices; and
  obtaining a globally unique identifier for the undesirable software image.

15. The non-transitory machine-readable medium of claim 14, wherein the undesirable software image fails to meet compliance standards that discriminate acceptable from unacceptable behavior of operation of software objects based on the undesirable software image.

16. The non-transitory machine-readable medium of claim 12, wherein each of the edge device is configured to only allow software objects to be instantiated using digitally signed software images.

17. A data processing system, comprising:
  a processor; and
  a memory coupled to the processor to store instructions, which when executed by the processor, cause the processor to perform operations for managing edge devices that host software objects, the operations comprising:
    obtaining an identifier of an undesirable software image, wherein a portion of the software objects hosted by the edge devices is based on the undesirable software image;
    identifying, using the identifier, a portion of the edge devices that host the portion of the software objects to obtain a list of edge devices;
    identifying, using the list of the edge devices, a second portion of the software objects that depend on the portion of the software objects to obtain a list of software objects;
    obtaining, using at least the list of the software objects, compliance decisions for each of the edge devices listed in the list of the edge devices;
    obtaining, using at least the compliance decisions, a prioritization for remediation of the undesirable software image; and
    assigning, using at least the prioritization, an entity to remediate the undesirable software image.

18. The data processing system of claim 17, wherein the operations further comprise:
  prior to obtaining the identifier:
    obtaining a software image usable to instantiate at least one of the software objects;
    obtaining, using the software image, a digitally signed software image;

obtaining, for the digitally signed software image, dependencies on other software images;

obtaining, for the digitally signed software image, compliance checks that indicate whether the digitally signed software image meets compliance standards; and storing the digitally signed software image, the dependencies, and the compliance checks in a software image repository.

19. The data processing system of claim 17, wherein obtaining the identifier of the undesirable software image comprises:

identifying the undesirable software image using a simulation environment that is hosted by a data center and separate from deployment of the edge devices; and obtaining a globally unique identifier for the undesirable software image.

20. The data processing system of claim 19, wherein the undesirable software image fails to meet compliance standards that discriminate acceptable from unacceptable behavior of operation of software objects based on the undesirable software image.

\* \* \* \* \*